(12) United States Patent
Renken et al.

(10) Patent No.: US 7,743,616 B2
(45) Date of Patent: Jun. 29, 2010

(54) CONTROL SYSTEM FOR A GENERATOR

(75) Inventors: David J. Renken, Prior Lake, MN (US); Bernard Wayne Benson, Lakeville, MN (US); Randy S. Burnham, Maple Grove, MN (US); Erich Lucht, Arden Hills, MN (US)

(73) Assignee: Thermo King Corporation, Minneapolis, MN (US)

( * ) Notice: Subject to any disclaimer, the term of this patent is extended or adjusted under 35 U.S.C. 154(b) by 732 days.

(21) Appl. No.: 11/548,867

(22) Filed: Oct. 12, 2006

(65) Prior Publication Data

US 2008/0087029 A1 Apr. 17, 2008

(51) Int. Cl.
*B60H 1/32* (2006.01)
*G01K 13/00* (2006.01)
*F25B 19/00* (2006.01)

(52) U.S. Cl. .............. 62/134; 62/129; 62/231
(58) Field of Classification Search .......... 62/62, 62/134, 230, 126, 127, 129, 231, 132; 290/40 B, 290/40 C
See application file for complete search history.

(56) References Cited

U.S. PATENT DOCUMENTS

| | | | | |
|---|---|---|---|---|
| 2,786,334 | A | * | 3/1957 | Wolf ............... 62/230 |
| 3,283,525 | A | * | 11/1966 | Fricke et al. .......... 62/134 |
| 4,604,528 | A | | 8/1986 | Norton |
| 5,510,950 | A | * | 4/1996 | Bills et al. ............ 361/93.2 |
| 5,977,646 | A | | 11/1999 | Lenz et al. |
| 5,977,647 | A | | 11/1999 | Lenz et al. |
| 6,044,651 | A | | 4/2000 | Reason et al. |
| 6,196,012 | B1 | | 3/2001 | Reason et al. |
| 6,321,550 | B1 | | 11/2001 | Chopko et al. |
| 6,405,550 | B1 | | 6/2002 | Reason et al. |
| 6,543,242 | B2 | | 4/2003 | Reason et al. |
| 6,679,071 | B1 | | 1/2004 | Storey et al. |
| 7,043,927 | B2 | | 5/2006 | Burchill et al. |
| 2003/0209909 | A1 | | 11/2003 | Fukaya |
| 2007/0296379 | A1 | | 12/2007 | Gendron |

OTHER PUBLICATIONS

European Search Report and Written Opinion for corresponding European Application No. 07253820.0.

* cited by examiner

*Primary Examiner*—Chen-Wen Jiang
(74) *Attorney, Agent, or Firm*—Michael Best & Friedrich LLP

(57) ABSTRACT

A generator set for a transport refrigeration unit that is operable at a first frequency and a second frequency. The generator set includes a generator and a prime mover coupled to the generator. The prime mover selectively drives the generator in least at a first non-zero speed and a second non-zero speed. A sensor is in electrical communication with the generator to sense a load of the generator and to deliver a signal indicative of the generator load. A controller is in electrical communication with the generator, the prime mover, and the sensor, and receives the signal indicative of the generator load. The controller selectively operates the generator at one of the first speed and the second speed in response to the signal indicative of the generator load.

42 Claims, 5 Drawing Sheets

US 7,743,616 B2

CONTROL SYSTEM FOR A GENERATOR

BACKGROUND

The present invention relates to a generator set for a transport refrigeration system. More specifically, the present invention relates to a control system for a multi-speed generator set that changes the speed of the generator set based on a load of the transport refrigeration system.

Existing transport refrigeration systems are used to cool containers, trailers, and other similar transport units. Modern containers may be efficiently stacked for shipment by ship or rail. When containers are shipped by truck, a single container is placed on a trailer chassis. When cargo in the container includes perishable products (e.g., food product, flowers, etc.), the temperature of the container must be controlled to limit loss of the cargo during shipment.

Some existing transport units include a generator set that supplies power to temperature-controlling components of the transport refrigeration system. These generator sets are typically attached directly to the container or trailer, and include an engine or motor to power a generator. During shipment of the transport units, the transport refrigeration systems must operate for extended periods of time (e.g., days, weeks).

Existing generator sets operate at a single, relatively constant speed to produce a constant output frequency and one or more output voltages (e.g., 230/460 VAC, etc.). The speed of these generator sets must be fast enough to provide adequate electrical power to the transport refrigeration system when the transport refrigeration system has a high demand or load. However, these generator sets operate at the same single speed regardless of whether the load on the transport refrigeration system is relatively high or relatively low. During extended periods of time without inspection by transportation workers, these generator sets may experience an out-of-fuel condition caused by operation of the generator set at the same single speed. The out-of-fuel condition causes a loss of power to the transport refrigeration system that may result in a loss of the perishable cargo. This is especially true when ambient temperature conditions are very hot or very cold.

SUMMARY

In one embodiment, the invention provides a generator set for a transport refrigeration unit that is operable at a first frequency and a second frequency. The generator set provides electrical power to the transport refrigeration unit, and includes a housing and a generator disposed within the housing. The generator set further includes a prime mover disposed in the housing and coupled to the generator to selectively drive the generator in at least a first non-zero speed and a second non-zero speed. A sensor is in electrical communication with the generator to sense a load of the generator and to deliver a signal indicative of the generator load. A controller is in electrical communication with the generator, the prime mover, and the sensor. The controller receives the signal indicative of the generator load, and selectively operates the generator at one of the first speed and the second speed in response to the signal indicative of the generator load.

In another embodiment, the invention provides a method of controlling a generator set for a transport refrigeration unit that is operable at a first frequency and a second frequency. The method includes providing a generator and a prime mover coupled to the generator, and driving the generator with the prime mover in at least one of a first non-zero speed and a second non-zero speed. The method also includes sensing a load of the generator using a sensor, and delivering a signal indicative of the sensed generator load to a controller in electrical communication with the prime mover and the generator, and selectively varying the speed of the generator between the first speed and the second speed with the controller in response to the sensed generator load.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
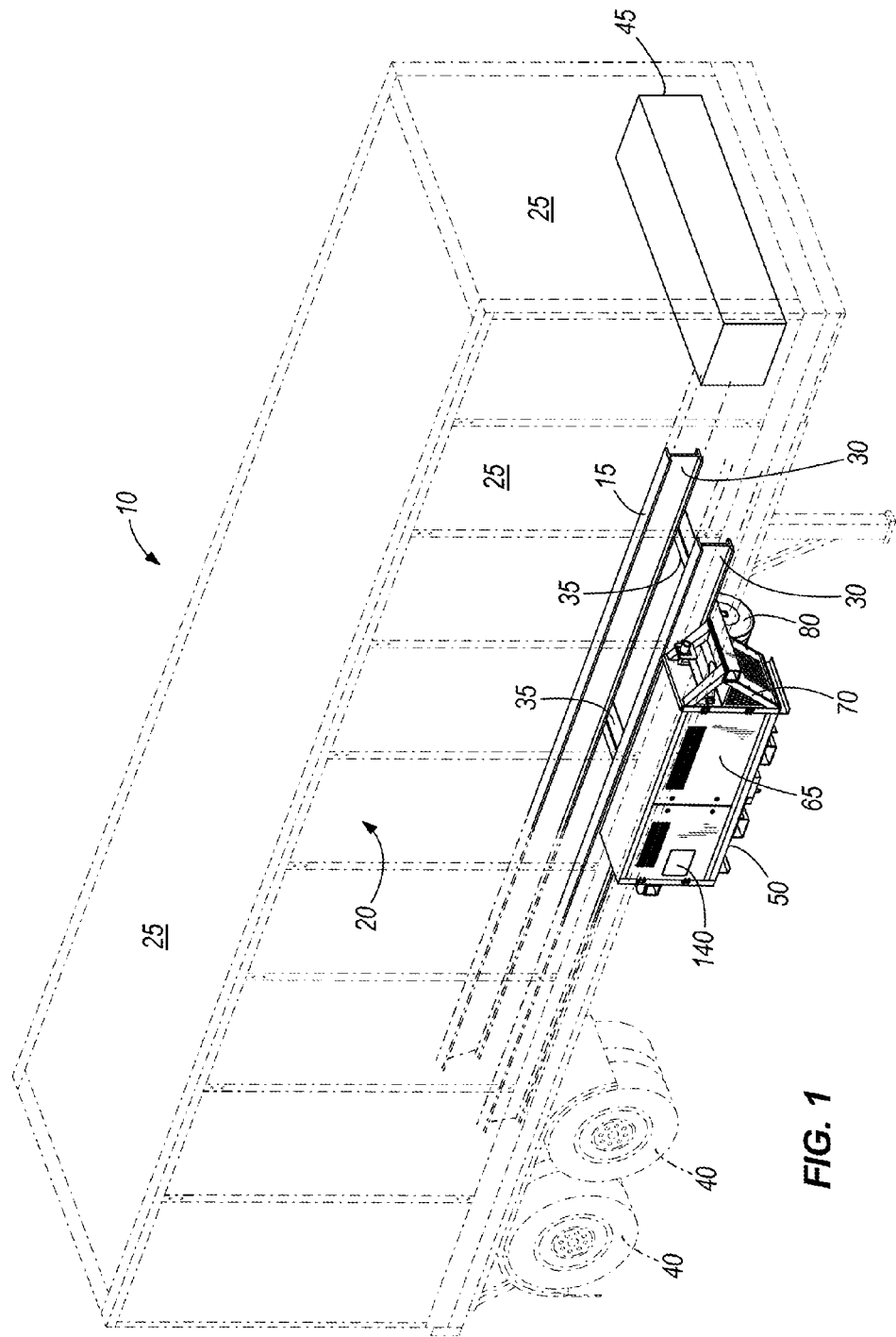
FIG. 1 is a perspective view of a transport refrigeration unit that includes a generator set embodying the invention.

FIG. 1 shows a trailer 10 for shipping perishable cargo. The trailer 10 includes a frame 15 and a space 20 for storing perishable cargo that is substantially enclosed by walls 25. The frame 15 includes frame members 30 that extend along a substantial length of a bottom side of the trailer 10. Cross members 35 are positioned between the frame members 30 to strengthen the frame 15. Some cross members 35 extend outward from a side of the frame 15. The trailer 10 illustrated in FIG. 1 further includes wheels 40 that are coupled to the frame members 30 so that the trailer 10 may be moved using a truck or other vehicle (not shown). In other embodiments, the trailer 10 may be a shipping container that is provided without wheels 40.

A transport refrigeration unit 45 and a generator set 50 are attached to the trailer 10. The transport refrigeration unit 45 is positioned adjacent a front side of the trailer 10 and is in communication with the space 20. However, the transport refrigeration unit 45 can be located anywhere on the trailer 10. The transport refrigeration unit 45 is operable at a first frequency and a second frequency (e.g., 60 Hertz and 50 Hertz, respectively), and is defined by a closed refrigerant circuit (not shown). The closed refrigerant circuit regulates various conditions (e.g., temperature, humidity, etc.) of the space 20, and includes a compressor coupled to a condenser and an evaporator that cools the space 20 and the perishable cargo. The refrigerant circuit employed in the transport refrigeration unit 45 is well known, and will not be discussed in detail.

Figure 2:
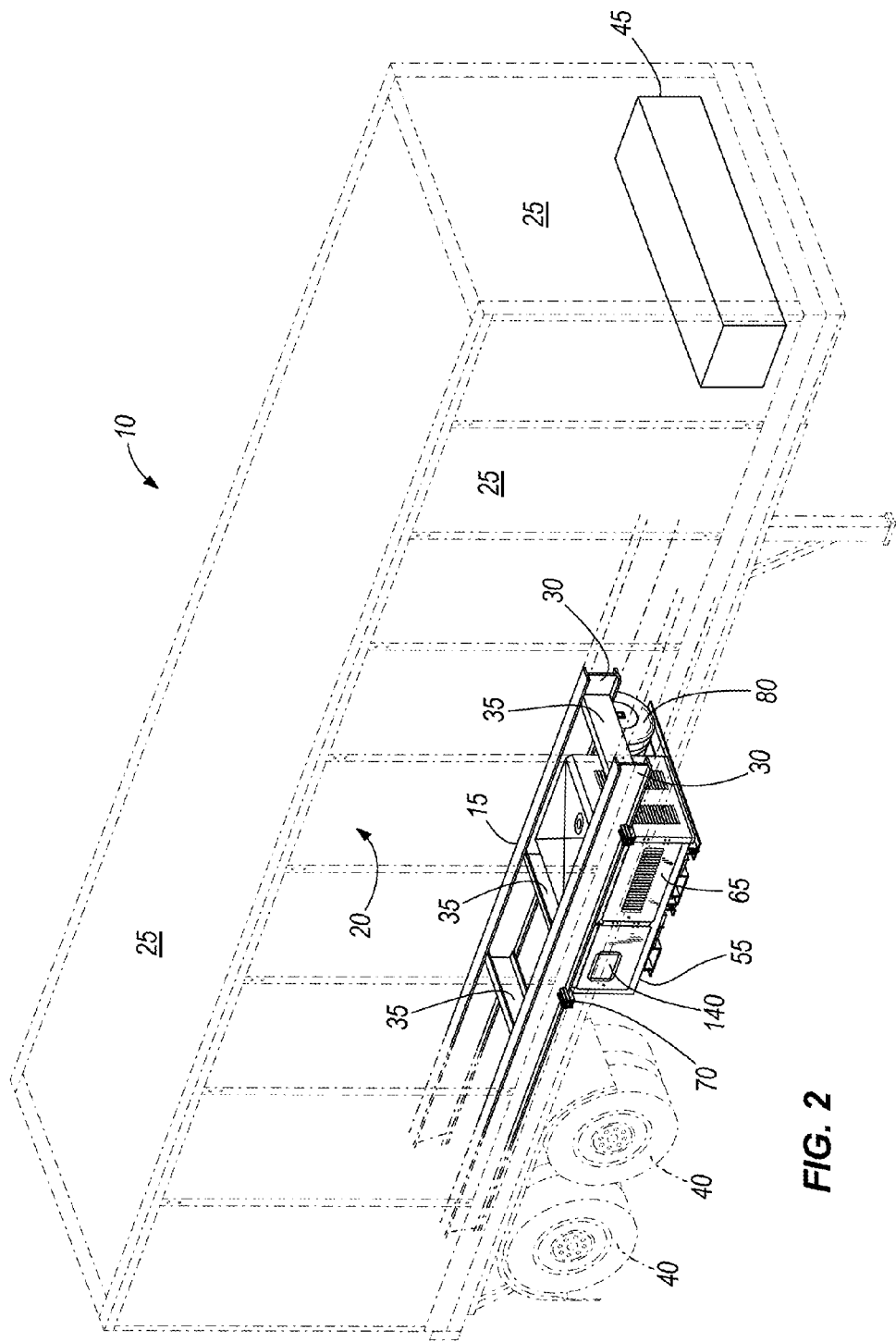
FIG. 2 is a perspective view of the transport refrigeration unit of FIG. 1 that includes a generator set according to another embodiment of the invention.
Figure 3:
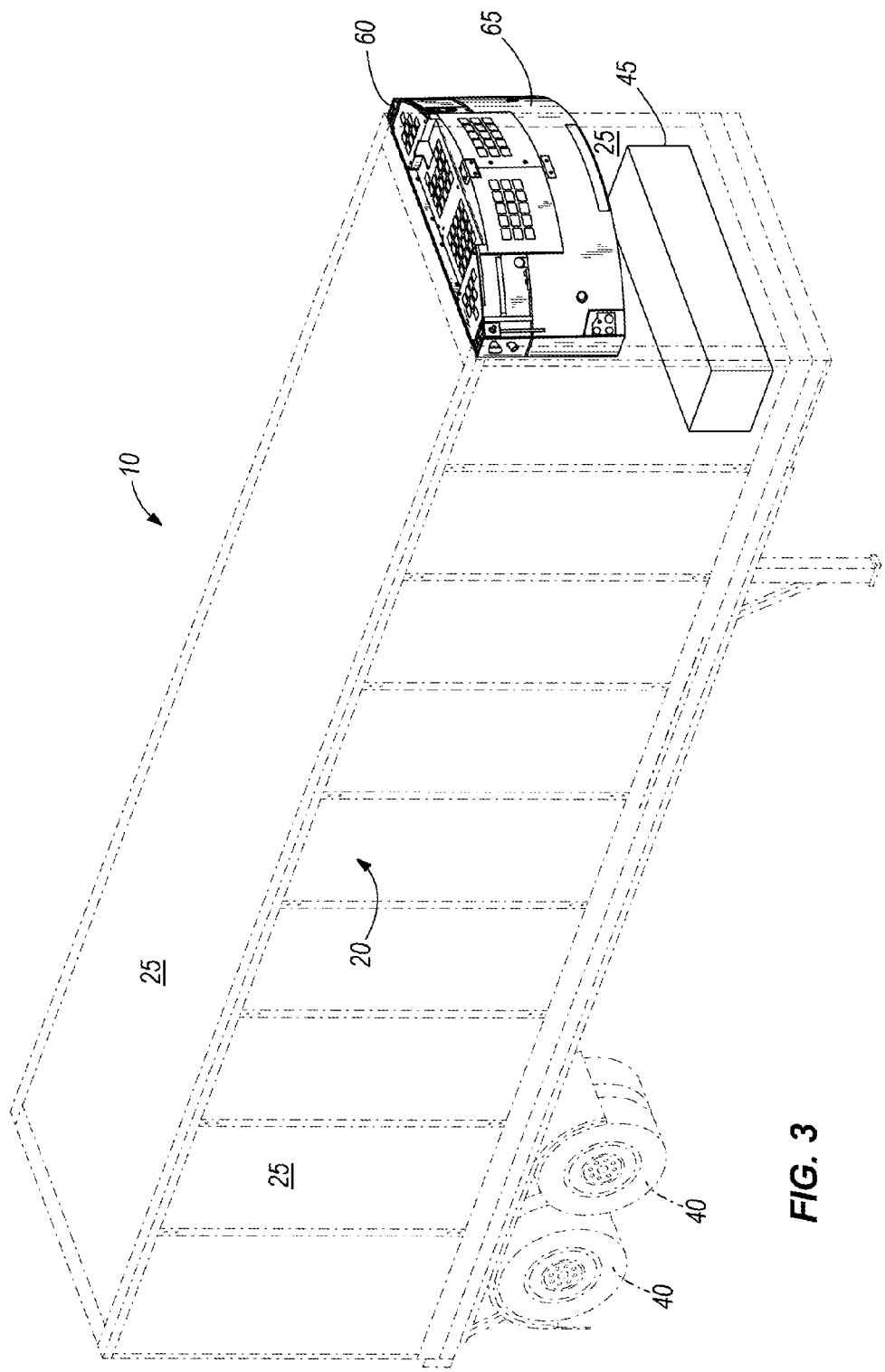
FIG. 3 is a perspective view of the transport refrigeration unit of FIG. 1 that includes a generator set according to yet another embodiment of the invention.

FIG. 1 shows the generator set 50 attached to the frame 15 along a side of the trailer 10 and substantially to one side of one of the frame members 30. FIG. 2 shows another generator set 55 attached to the frame 15 substantially between the frame members 30 and aligned with a center of the bottom of the trailer 10. FIG. 3 shows yet another generator set 60 attached to one of the walls 25 adjacent a front of the trailer 10. The generator sets 55, 60 shown in FIGS. 2 and 3 include elements that are similar to the elements of the generator set 50 illustrated in FIG. 1. As such, the invention will be discussed with regard to the generator set 50. However, it is to be understood that each generator set 50, 55, 60 is within the scope of the invention and should not be limited to the generator set 50 discussed herein.

FIG. 1 shows the generator set 50 that includes a housing 65 attached to the frame 15 by a mounting assembly 70. The mounting assembly 70 extends between the housing and the cross members 35, and is made of a high-strength material (e.g., steel, etc.) to rigidly attach the generator set 50 to the trailer 10.

Figure 4:
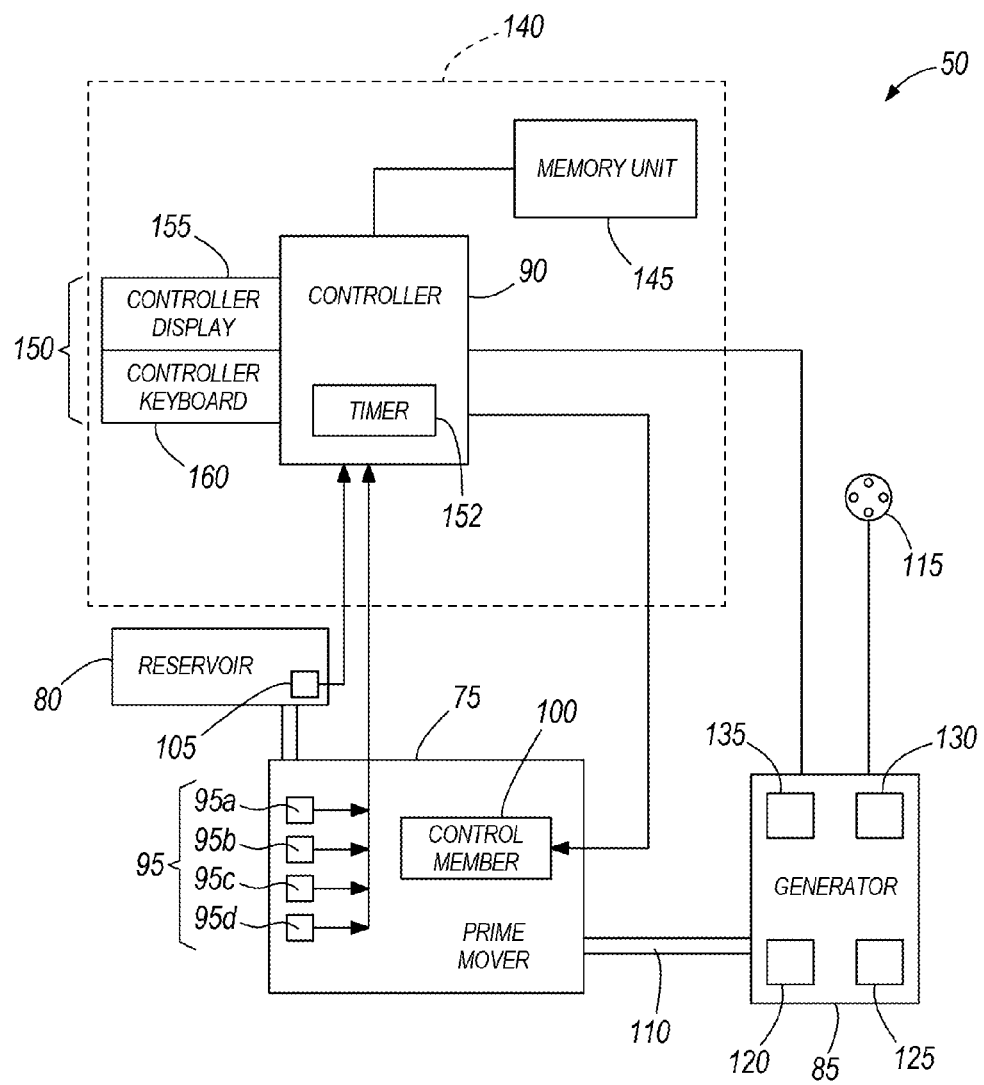
FIG. 4 is a schematic view of the generator set of FIG. 1.

FIG. 4 shows that the generator set 50 further includes a prime mover 75, a fuel reservoir 80, a generator 85, and a controller 90, each disposed in the housing 65. The illustrated prime mover 75 is an internal combustion engine (e.g., diesel engine, etc.) that has a cooling system (e.g., water or liquid coolant system), an oil lubrication system, and an electrical system (none shown). An air filtration system (not shown) filters air directed into a combustion chamber (not shown) of the prime mover 75. The prime mover 75 includes component sensors 95 that deliver signals indicative of various component conditions to the controller 90. For example, when the prime mover 75 is a diesel engine, the component sensors 95 can include a water temperature sensor 95$a$, an engine rpm sensor 95$b$, an oil pressure sensor 95$c$, and an airflow sensor 95$d$. In some embodiments, the prime mover 75 may include additional sensors (not shown) to sense other component conditions of the prime mover 75 (e.g., fuel injection, etc.).

The prime mover 75 further includes a governor mechanism (not shown) and an electromechanical device or control member 100 coupled to the governor mechanism to control a speed of the prime mover 75. The governor mechanism may be a governor or fuel solenoid that regulates fuel flow into the prime mover 75. The prime mover 75 is operable at least at a first speed and a second speed, and the control member 100 is configured to vary the prime mover 75 between the first speed and the second speed using the governor mechanism. In the illustrated embodiment, the first speed is about 1800 revolutions per minute (RPMs), and the second speed is about 1500 RPMs. In other embodiments, the first and second speeds may be different from 1800 RPMs and 1500 RPMs, respectively.

The fuel reservoir 80 is in fluid communication with the prime mover 75 to deliver a supply of fuel to the prime mover 75. As shown in FIG. 1, the fuel reservoir 80 is coupled to the housing 65 below the frame 15. As shown in FIG. 3, the fuel reservoir 80 includes a fuel sensor 105 that is in electrical communication with the controller 90 to deliver a signal indicative of a fuel level in the fuel reservoir 80.

The generator 85 is coupled to the prime mover 75 by a drive shaft 110 that transfers mechanical energy from the prime mover 75 to the generator 85. The generator 85 includes a power receptacle 115 that is in electrical communication with the transport refrigeration unit 45 via a power cable (not shown) to provide electrical power to the transport refrigeration unit 45.

The generator 85 is an alternating current ("AC"), 3-phase generator that generally includes a rotor 120, a stator 125, and a voltage regulator or DC generator 130. The rotor 120 is coupled to the drive shaft 110 such that the prime mover 75 is operable to rotatably drive the rotor 120 at least at the first non-zero speed and the second non-zero speed. The stator 125 is a stationary component of the generator 85 that includes magnetic pole pairs (e.g., two pole pairs).

The voltage regulator 130 includes a field voltage and a field current that are generated by a regulation element (not shown) that is coupled to the voltage regulator 130. In some embodiments, the regulation element includes batteries or other solid-state components that generate a direct current through the voltage regulator 130. Those skilled in the art will understand that the field voltage and the field current define a field excitation. The field excitation of the generator 85 is generally considered a field of the generator 85. The field can be one of the rotor 120 and the stator 125, depending on the component to which the field excitation is applied.

Rotation of the rotor 120 through the magnetic field induces an output current from the generator 85. The induced output 120 current produces an output voltage of the generator 85 that is directed through the power receptacle 115 to the transport refrigeration unit 45. The component of the generator 85 where the output voltage is drawn is generally considered an armature of the generator 85, and is one of the rotor 120 and the stator 125 (i.e., the component of the generator 85 that does not receive the field excitation). Generally, the armature converts rotational mechanical energy from the drive shaft 110 to electrical energy from the generator 85. One of ordinary skill in the art would recognize that the rotor 120 and the stator 125 are interchangeable as the armature and the field of the generator 85, and that other generators could be used in place of the generator 85. The generator 85 as described herein is exemplary only.

The generator 85 further includes an output frequency that can be determined by the speed of the prime mover or the field voltage of the generator. In some embodiments, the generator 85 is operable at a first output frequency when the prime mover 75 is operated at the first speed, and is operable at a second output frequency when the prime mover 75 is operated at the second speed. The first output frequency of the generator 85 is the same as the first frequency of the transport refrigeration unit 45 (e.g., 60 Hertz). The second output frequency of the generator 85 is the same as the second frequency of the transport refrigeration unit 45 (e.g., 50 Hertz).

The output voltage of the generator 85 is determined by the output frequency. As such, the generator 85 is operable at a first output voltage in response to operation of the generator 85 at the first frequency. The generator 85 is further operable at a second output voltage in response to operation of the generator 85 at the second frequency. For example, when the generator 85 is operated at the first frequency (e.g., 60 Hertz), the first output voltage is 460 volts. When the generator 85 is operated at the second frequency (e.g., 50 Hertz), the second output voltage is 380 volts. Thus, the speed of the prime mover 75 determines the frequency and output voltage of the generator 85.

The generator 85 is defined by a constant load capacity that is sufficient to provide adequate power to the transport refrigeration unit 45 under various loads. A load on the generator 85 corresponds to the cooling demand or load on the transport refrigeration unit 45 (e.g., electrical power needed by the transport refrigeration unit), and is variable in response to changes in the load on the transport refrigeration unit 45. The generator 85 is operable at a load ratio that is dependent on the generator load for a given generator load capacity, and may vary from zero percent of the generator load capacity (i.e., when no generator load exists) to 100 percent of the generator load capacity (i.e., when the transport refrigeration unit 45 is operating at full capacity, indicating a full load on the generator 85).

A load sensor 135 is in electrical communication with the generator 85 to sense the generator load, and is further in electrical communication to deliver a signal indicative of the generator load to the controller 90. In one embodiment, the load sensor 135 is configured to sense the generator load based on the field current of the generator 85. In another embodiment, the load sensor 135 is configured to sense the generator load based on the field voltage of the generator 85. In yet another embodiment, the load sensor 135 is configured to sense the generator load based on the output current of the generator 85.

The controller 90 is coupled to the housing 65 within a control panel 140 (FIG. 1). In other embodiments, the controller 90 may be located remotely from the housing 65. The controller 90 is a microprocessor that makes various operating decisions in response to various signals from the remaining components of the generator set 50. The controller 90 is in electrical communication with the generator 85, the component sensors 95, the control member 100, and the fuel sensor 105.

FIG. 4 shows the control panel 140 that further includes a memory unit 145, an operator interface 150, and a timer 152. The memory unit 145, the operator interface 150, and the timer 152 are in electrical communication with the controller 90. In some embodiments, the memory unit 145 may be a Random Access Memory ("RAM") that can maintain a data log related to parameters of the prime mover 75 and the generator 85, as a well as other data.

The operator interface 150 includes a display 155 and a keyboard 160 for viewing and entering commands into the controller 90. The timer 152 separately measures a duration time that the prime mover 75 operates at the first speed, and a duration time that the prime mover 75 operates at the second speed.

In operation, the controller 90 receives the signal indicative of the fuel level from the fuel sensor 105 to monitor the quantity of fuel available to the prime mover 75. In response to a signal from the fuel sensor 105 indicative of a low fuel condition, the controller 90 generates a warning or alarm.

The controller 90 also receives signals from the component sensors 95 that are indicative of various operating parameters of the prime mover (e.g., prime mover speed, coolant temperature, etc.). The controller 90 compares these signals with various predetermined parameters stored in the memory unit 145 that are associated with the respective signals from the component sensors 95. When the parameters monitored by the component sensors 95 are within predetermined parameters, the prime mover 75 is in a normal operating state. When one or more of the monitored parameters are outside the predetermined parameters stored in the memory unit 145, the controller 90 may generate an alarm or warning signal indicative of an out-of-state condition for the prime mover 75.

The prime mover 75 is variable between the first speed and the second speed to control the frequency and the output voltage of the generator 85. When the prime mover 75 operates at the first speed, the generator 85 operates at the first frequency and the first output voltage. When the prime mover 75 operates at the second speed, the generator 85 operates at the second frequency and the second output voltage. The prime mover 75 is variable between the first speed and the second speed using the controller 90 such that the frequency and output voltage of the generator 85 can be changed. Under normal operating conditions, the prime mover 75 operates at one of the first speed and the second speed such that the frequency and the output voltage of the generator 85 remain substantially constant relative to the prime mover speed.

The load sensor 135 senses the load of the generator 85 and sends the signal indicative of the generator load to the controller 90. The controller 90 receives the signal indicative of the sensed load and determines a load ratio based on the sensed load and the load capacity of the generator 80 stored in the memory unit 145. The controller 90 compares the calculated load ratio to a predetermined load ratio stored in the memory unit 145. The controller 90 selectively varies the speed of the prime mover 75 to change the frequency and the output voltage of the generator 85 based on the comparison of the calculated and predetermined load ratios.

Figure 5:
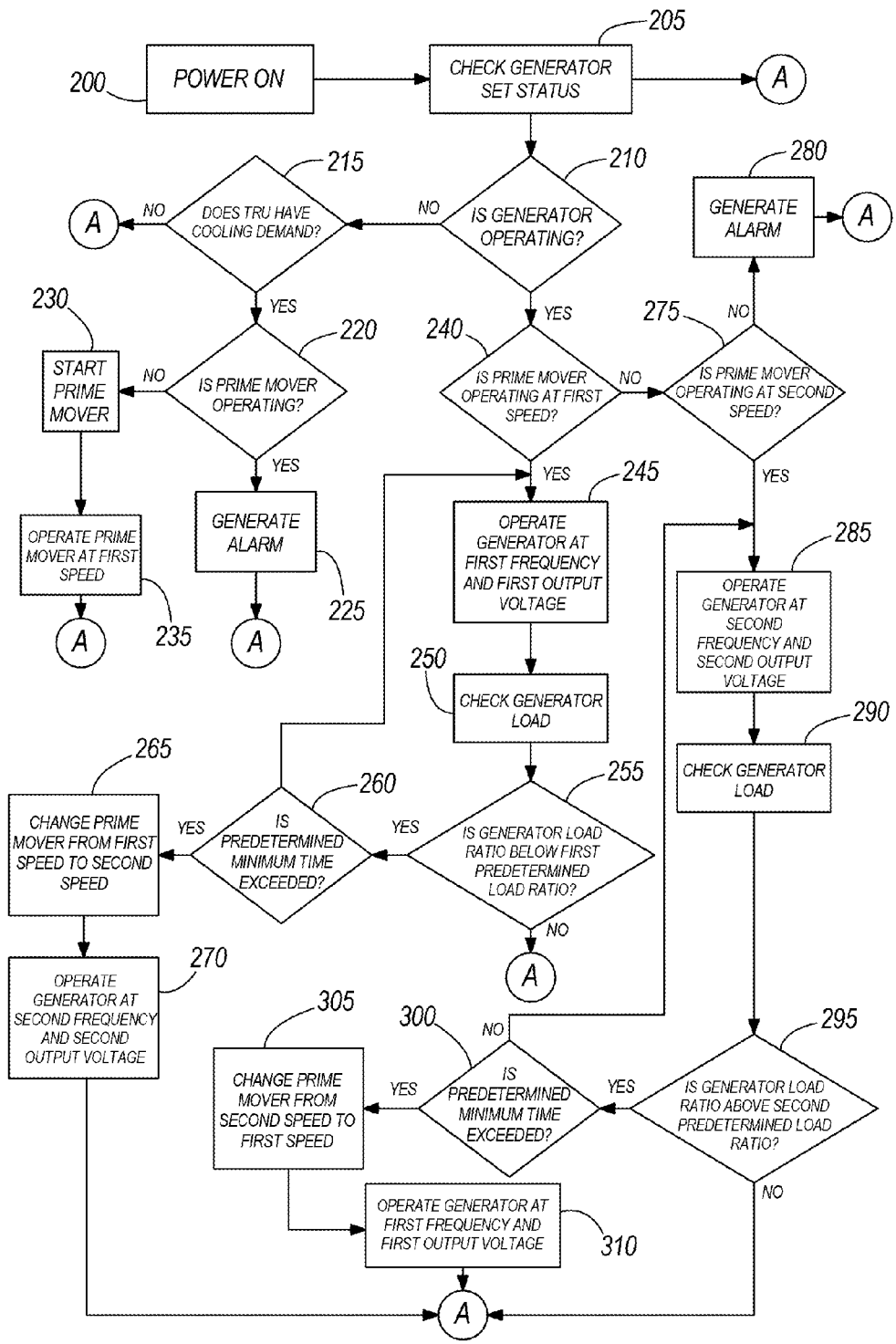
FIG. 5 is a flow chart of the operation of the generator set of FIG. 1.

FIG. 5 shows one construction of operation of the controller 90. After the controller 90 is turned on at Step 200, the controller 90 checks the status of the generator set 50 at Step 205. At Step 210, the controller 90 determines whether the generator 85 is operating. Under normal operating conditions, the generator 85 is operating when the generator 85 is "ON." If the answer at Step 210 is "No," (i.e., the generator 85 does not have power or is in an "Off" state), the controller 90 determines at Step 215 whether the transport refrigeration unit 45 has a non-zero cooling demand or load. If the answer at Step 215 is "No," the transport refrigeration unit 45 does not need electrical power from the generator set 50 and the process returns to Step 205.

If the transport refrigeration unit 45 is subjected to a cooling demand or load (i.e., the answer at Step 215 is "Yes"), the controller 90 checks whether the prime mover 75 is operating at Step 220. If the prime mover 75 is "ON" or operating (i.e., the answer at Step 220 is "Yes"), an alarm is generated at Step 225. The alarm signals to an operator that the generator 85 is not adequately providing electrical power to the transport refrigeration unit 45 because no electrical power is being supplied by the generator 85 when the prime mover 75 is operating at one of the first speed and the second speed. Once the alarm is generated at Step 225, the process returns to Step 205.

The controller 90 starts the prime mover 75 at Step 230 if the answer at Step 220 is "No." After initial startup of the prime mover 75, the controller 90 controls the prime mover 75 at the first speed using the governor mechanism and the control member 100 (Step 235). The process then returns to Step 205.

If the generator 85 is "ON" at Step 210 (i.e., the answer at Step 210 is "Yes"), the controller 90 determines whether the prime mover 75 is operating at the first speed at Step 240. The controller 90 operates the generator 85 at the first frequency and the first output voltage at Step 245 when the prime mover 75 operates at the first speed (i.e., the answer at Step 40 is "Yes"). The controller 90 then checks the generator load at Step 250 based on the signal received from the load sensor 135. The controller 90 calculates the generator load ratio based on the sensed generator load and the generator load capacity stored in the memory unit 145. At Step 255, the controller 90 compares the calculated generator load ratio with a first predetermined load ratio stored in the memory unit 145 and determines whether the calculated load ratio is below the first predetermined load ratio. In the illustrated embodiment, the first predetermined load ratio is about 50 percent of the generator load capacity. In other embodiments, the first predetermined load ratio may be defined above or below 50 percent of the generator load capacity.

The process returns to Step 205 if the generator 85 is operating at a load ratio above the predetermined load ratio (i.e., the answer at Step 255 is "No"). If the generator 85 is operating at a load ratio below the first predetermined load ratio (i.e., the answer at Step 255 is "Yes"), the controller 90 determines whether the generator 85 has operated below the first predetermined load ratio for a predetermined minimum time at Step 260 using the timer 152. In some embodiments, the minimum predetermined time can be 30 minutes. In other embodiments, the minimum predetermined time can be less or more than 30 minutes. If the generator 85 has operated below the first predetermined load ratio for less than the predetermined minimum time at Step 260, the prime mover 75 continues to operate at the first speed, and the generator 85 continues to operate at the first frequency and the first output voltage (Step 245).

The controller 90 changes the prime mover from the first speed to the second speed at Step 265 if the generator 85 has operated below the first predetermined load ratio in excess of the predetermined minimum time at Step 260. In the illustrated embodiment, the change from the first speed to the second speed is controlled by the controller 90 within a transition phase of one second or less. Once the prime mover 75 has changed to the second speed, the generator 85 operates at the second frequency and the second output voltage (Step 270). The process then returns to Step 205.

The controller 90 determines whether the prime mover 75 is operating at the second speed at Step 275 when the prime mover speed does not equal the first speed at Step 240. The controller 90 generates an alarm at Step 280 when the prime mover 75 is not operating at about the first speed or the second speed. The process then returns to Step 205.

The controller 90 operates the generator 85 at the second frequency and the second output voltage at Step 285 if the prime mover 75 is operating at the second speed at Step 275. At Step 290, the controller 90 receives the signal indicative of the generator load from the load sensor 135, and determines the generator load ratio based on the sensed generator load and the predetermined generator load capacity stored in the memory unit 145. At Step 295, the controller 90 compares the calculated generator load ratio with a second predetermined load ratio that is stored in the memory unit 145. In some embodiments, the second predetermined load ratio is different from the first predetermined load ratio. For example, the second predetermined load ratio in the illustrated embodiment is 75 percent of the generator load capacity. In other embodiments, the second predetermined load ratio may be the same as the first predetermined load ratio (e.g., 50 percent of the generator load capacity).

The process returns to Step 205 if the calculated generator load ratio is not above the second predetermined load ratio at Step 295 (i.e., the prime mover 75 continues to operate at the second speed and the generator 85 continues to operate at the second frequency and the second output voltage). If the generator load ratio is above the second predetermined load ratio at Step 295, the controller 90 determines at Step 300 whether the generator 85 has operated above the second predetermined load ratio in excess of a predetermined minimum time using the timer 152. The predetermined minimum time at Step 300 can be the same as or different from the predetermined minimum time discussed with regard to Step 260. If the time that the generator 85 has operated below the second predetermined load ratio does not exceed the predetermined minimum time at Step 300, the prime mover 75 continues to operate at the second speed, and the generator 85 continues to operate at the second frequency and the second output voltage (Step 285).

The controller 90 changes the prime mover 75 from the second speed to the first speed at Step 305 if the time that the generator 85 has operated below the first predetermined load ratio exceeds the predetermined minimum time at Step 300. Once the prime mover 75 has changed to the first speed, the generator 85 operates at the first frequency and the first output voltage (Step 310).

In general, when the load on the transport refrigeration unit 45 is increased from a relatively low load to a relatively high load, (i.e., higher cooling demand), at least one of the field voltage and the speed of the prime mover 75 can be increased to provide adequate electrical power to the transport refrigeration unit 45. When the load on the transport refrigeration unit load is decreased from a relatively high load to a relatively low load (i.e., lower cooling demand), at least one of the field voltage and the speed of the prime mover 75 can be decreased to provide adequate, but not excessive electrical power to the transport refrigeration unit 45.

The controller 90 selectively operates the prime mover 75 and the generator 85 at one of the first speed and the second speed in response to the signal indicative of the generator load to reduce fuel consumption of the generator set 50. The generator set 50 can be varied by the controller 90 between the first speed and the second speed to adjust for changes in the load on the transport refrigeration unit 45. The prime mover 75 operates at the first speed when the generator load is indicative of a generator load ratio above the first predetermined load ratio, and when the generator set 50 is cycled between an "ON" and an "OFF" state. The prime mover 75 operates at the second speed when the generator load is indicative of a generator load ratio below the first predetermined load ratio, and until the generator load ratio exceeds the second predetermined load ratio for the predetermined minimum time.

Various features and advantages of the invention are set forth in the following claims.

What is claimed is:

1. A generator set for a transport refrigeration unit that is operable at a first frequency and a second frequency, the generator set providing electrical power to the transport refrigeration unit, the generator set comprising:
   a housing;
   a generator disposed in the housing;
   a prime mover disposed in the housing and coupled to the generator to selectively drive the generator in least at a first non-zero speed and a second non-zero speed;
   a sensor in electrical communication with the generator to sense a load of the generator and to deliver a signal indicative of the generator load; and
   a controller in electrical communication with the generator, the prime mover, and the sensor, the controller configured to receive the signal indicative of the generator load, and configured to selectively operate the generator at one of the first non-zero speed and the second non-zero speed in response to the signal indicative of the generator load.

2. The generator set of claim 1, wherein the generator is defined by a load capacity, and wherein the generator load defines a load ratio with respect to the load capacity.

3. The generator set of claim 2, wherein the controller is configured to operate the generator at the first speed in response to the generator load above a predetermined load ratio, and wherein the controller is configured to operate the generator at the second speed in response to the generator load below the predetermined load ratio.

4. The generator set of claim 2, wherein the controller is configured to operate the generator at the second speed in response to the generator load below a first predetermined load ratio, and wherein the controller is configured to operate the generator at the first speed in response to the generator load above a second predetermined load ratio.

5. The generator set of claim 4, wherein the second predetermined load ratio is different from the first predetermined load ratio.

6. The generator set of claim 4, wherein the first predetermined load ratio is at about 50 percent of the generator load capacity, and wherein the second predetermined load ratio is at about 75 percent of the generator load capacity.

7. The generator set of claim 1, wherein the controller is configured to maintain the generator at the first speed for a minimum predetermined time in response to startup of the prime mover.

8. The generator set of claim 1, wherein the controller is configured to maintain the generator at the second speed for a minimum predetermined time after the generator is varied from the first speed to the second speed.

9. The generator set of claim 1, wherein the generator is operable at a first frequency in response to the generator being driven at the first speed, and operable at a second frequency in response to the generator being driven at the second speed.

10. The generator set of claim 9, wherein the first frequency and the second frequency are determined by at least one of a prime mover speed and a field voltage of the generator.

11. The generator set of claim 9, wherein the first frequency of the generator is approximately equal to the first frequency of the transport refrigeration unit, and wherein the second frequency of the generator is approximately equal to the second frequency of the transport refrigeration unit.

12. The generator set of claim 11, wherein the first frequency of the generator is 60 Hertz and the second frequency of the generator is 50 Hertz.

13. The generator set of claim 9, wherein the controller is configured to operate the generator at a first output voltage in response to the generator being operated at the first frequency, and wherein the controller is configured to operate the generator at a second output voltage in response to the generator being operated at the second frequency.

14. The generator set of claim 13, wherein the first output voltage is at about 460 volts, and wherein the second output voltage is at about 380 volts.

15. The generator set of claim 1, wherein the first speed is at about 1800 revolutions per minute, and wherein the second speed is at about 1500 revolutions per minute.

16. The generator set of claim 1, further comprising an electro-mechanical device coupled to the prime mover, wherein the controller is in electrical communication with the electro-mechanical device to selectively drive the generator at the first speed and the second speed.

17. The generator set of claim 1, wherein the signal indicative of the generator load is determined by at least one of a field current of the generator, a field voltage of the generator, and an output current of the generator.

18. A method of controlling a generator set for a transport refrigeration unit operable at a first frequency and a second frequency, the method comprising:
providing a generator and a prime mover coupled to the generator;
driving the generator with the prime mover in least at one of a first non-zero speed and a second non-zero speed;
sensing a load of the generator using a sensor and delivering a signal indicative of the sensed generator load to a controller in electrical communication with the prime mover and the generator; and
selectively varying the speed of the generator between the first speed and the second speed with the controller in response to the sensed generator load.

19. The method of claim 18, further comprising
starting the prime mover; and
driving the generator with the prime mover at the first speed for a minimum predetermined time.

20. The method of claim 18, wherein selectively varying the speed of the generator includes
defining a load capacity of the generator;
defining a generator load ratio based on the sensed generator load and the load capacity of the generator; and
driving the generator with the prime mover at one of the first speed and the second speed.

21. The method of claim 20, wherein driving the generator at one of the first speed and the second speed includes
driving the generator with the prime mover at the first speed;
changing the generator speed from the first speed to the second speed in response to the sensed generator load indicative of the generator load ratio below a predetermined load ratio; and
driving the generator with the prime mover at the second speed.

22. The method of claim 21, wherein driving the generator with the prime mover at the second speed includes driving the generator at the second speed for a minimum predetermined time.

23. The method of claim 20, wherein driving the generator at one of the first speed and the second speed includes
driving the generator with the prime mover at the second speed;
changing the generator speed from the second speed to the first speed in response to the sensed generator load indicative of the generator load ratio above a predetermined load ratio; and
driving the generator with the prime mover at the first speed.

24. The method of claim 20, wherein selectively varying the speed of the generator includes
varying the speed of the generator from the first speed to the second speed in response to the sensed generator load indicative of the generator load ratio below a first predetermined load ratio; and
varying the speed of the generator from the second speed to the first speed in response to the sensed generator load indicative of the generator load ratio above a second predetermined load ratio.

25. The method of claim 24, wherein varying the speed of the generator from the first speed to the second speed includes decreasing the generator speed in response to the generator load indicative of the generator load ratio below the first predetermined load ratio.

26. The method of claim 24, wherein varying the speed of the generator from the second speed to the first speed includes increasing the generator speed in response to the generator load indicative of the generator load ratio above the second predetermined load ratio.

27. The method of claim 18, further comprising
operating the generator at a first frequency in response to driving the generator at the first speed; and
operating the generator at a second frequency in response to driving the generator at the second speed.

28. The method of claim 18, wherein selectively varying the generator speed includes varying the generator between a first frequency and a second frequency in response to varying the generator speed; and varying an output voltage of the generator in response to varying the generator between the first frequency and the second frequency.

29. The method of claim 28, wherein varying the generator between the first frequency and the second frequency includes determining the frequency with the controller by sensing at least one of a prime mover speed and a magnetic field voltage of the generator.

30. The method of claim 18, wherein sensing the generator load includes sensing at least one of a field current of the generator, a field voltage of the generator, and an output current of the generator.

31. A generator set for a transport refrigeration unit, the transportation refrigeration unit operable at a first frequency and a second frequency, the generator set providing electrical power to the transport refrigeration unit, the generator set comprising:

a housing;

a generator disposed in the housing and configured to provide electrical power to the transportation refrigeration unit;

a prime mover disposed in the housing and coupled to the generator to selectively drive the generator at least at a first non-zero speed and a second non-zero speed;

a controller in electrical communication with the generator and the prime mover; and a timer in electrical communication with the controller, the timer operable to determine a duration of time that the prime mover drives the generator at the first non-zero speed, wherein the controller is operable to change the prime mover from operating the generator at the first non-zero speed to operating the generator at the second non-zero speed based on the duration of time determined by the timer.

32. The generator set of claim 31, wherein the prime mover is a diesel engine.

33. The generator set of claim 31, wherein the controller is configured to maintain the generator at the first non-zero speed for a minimum predetermined time in response to startup of the prime mover.

34. The generator set of claim 31, wherein the generator is operable at a first frequency in response to the generator being driven at the first non-zero speed, and operable at a second frequency in response to the generator being driven at the second non-zero speed.

35. The generator set of claim 34, wherein the first frequency and the second frequency are determined by at least one of a prime mover speed and a field voltage of the generator.

36. The generator set of claim 34, wherein the first frequency of the generator is approximately equal to the first frequency of the transport refrigeration unit, and wherein the second frequency of the generator is approximately equal to the second frequency of the transport refrigeration unit.

37. The generator set of claim 36, wherein the first frequency of the generator is 60 Hertz and the second frequency of the generator is 50 Hertz.

38. The generator set of claim 34, wherein the controller is configured to operate the generator at a first output voltage in response to the generator being operated at the first frequency, and wherein the controller is configured to operate the generator at a second output voltage in response to the generator being operated at the second frequency.

39. The generator set of claim 38, wherein the first output voltage is at about 460 volts, and wherein the second output voltage is at about 380 volts.

40. The generator set of claim 31, wherein the first non-zero speed is about 1800 revolutions per minute, and wherein the second non-zero speed is about 1500 revolutions per minute.

41. The generator set of claim 31, further comprising an electro-mechanical device coupled to the prime mover, wherein the controller is in electrical communication with the electro-mechanical device to selectively drive the generator at the first non-zero speed and the second non-zero speed.

42. The generator set of claim 31, wherein the controller is operable to change the prime mover from operating the generator at the first non-zero speed to operating the generator at the second non-zero speed in response to the duration of time determined by the timer being in excess of a predetermined time.

\* \* \* \* \*